United States Patent [19]

McWhorter

[11] 4,062,206
[45] Dec. 13, 1977

[54] LOCKING LOAD BINDER

[76] Inventor: Delmer L. McWhorter, 929 Drever St., West Sacramento, Calif. 95691

[21] Appl. No.: 731,048

[22] Filed: Oct. 8, 1976

[51] Int. Cl.² .............................................. E05B 73/00
[52] U.S. Cl. ............................................ 70/14; 70/19; 70/34; 70/61
[58] Field of Search .................. 70/14, 15, 19, 57–58, 70/61–62; 211/32–34, 4, 8, 60 T; 248/499, 500; 280/179 R, 179 A; 254/74, 78

[56] References Cited

U.S. PATENT DOCUMENTS

| 3,914,965 | 10/1975 | Paxton | 70/34 |
| 3,974,668 | 8/1976 | McWhorter | 70/14 |

Primary Examiner—Robert L. Wolfe
Attorney, Agent, or Firm—Blair & Brown

[57] ABSTRACT

A locking load binder having a conical lock tongue mounted on the handle and a keeper link secured to the yoke on one side of the handle and adapted to cooperate with the lock tongue to secure the handle thereto. The lock tongue includes cam driven locking balls which cooperate with the keeper link.

3 Claims, 7 Drawing Figures

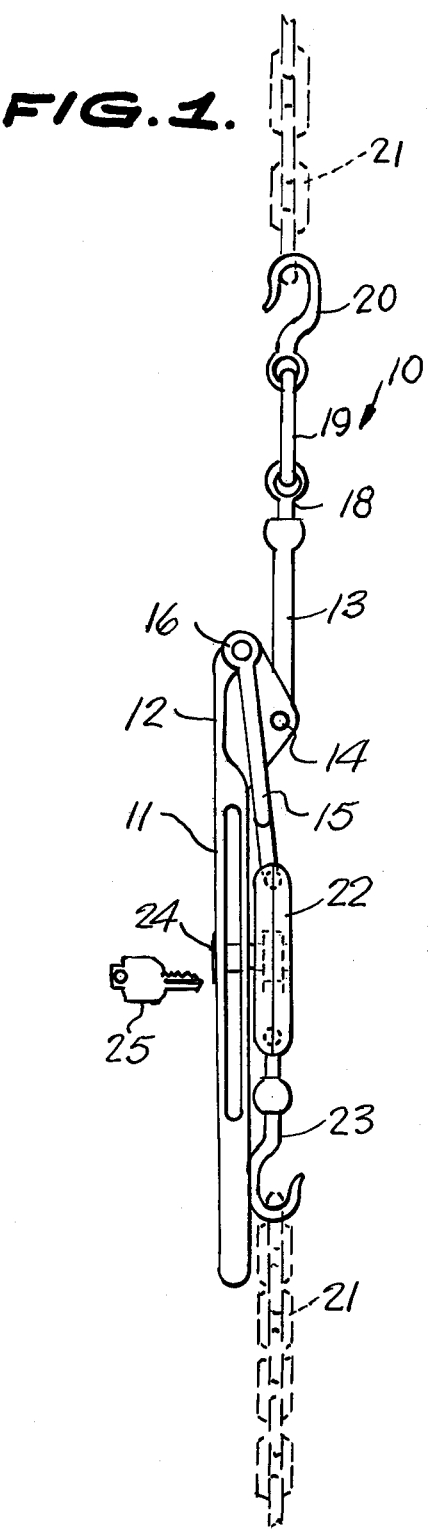
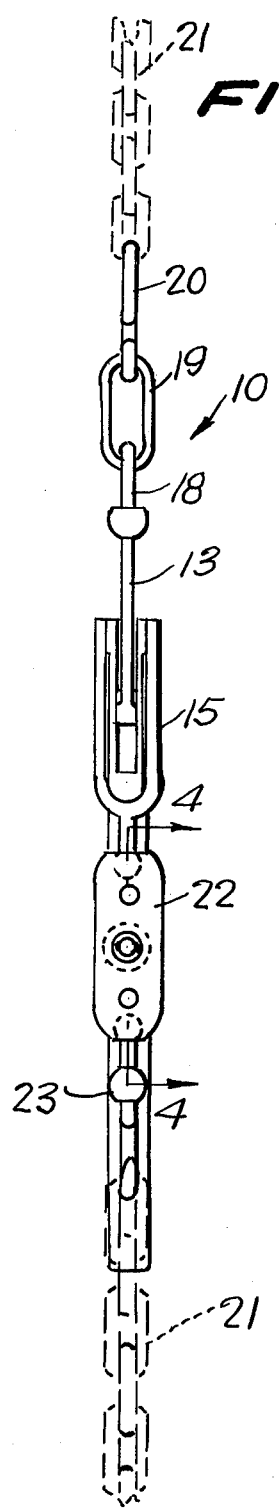
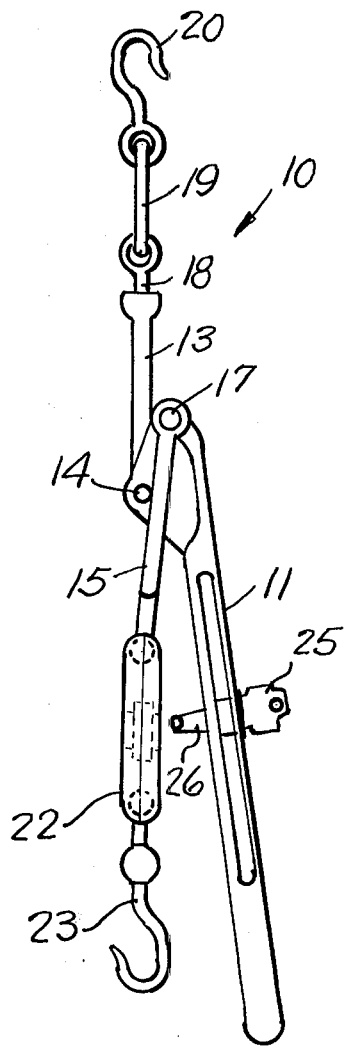

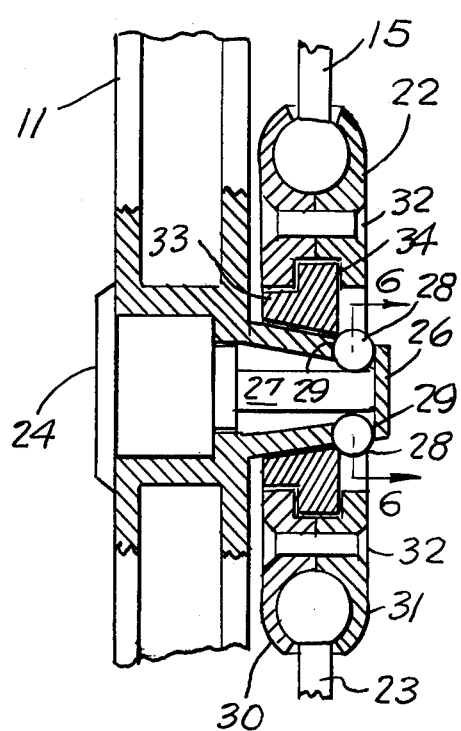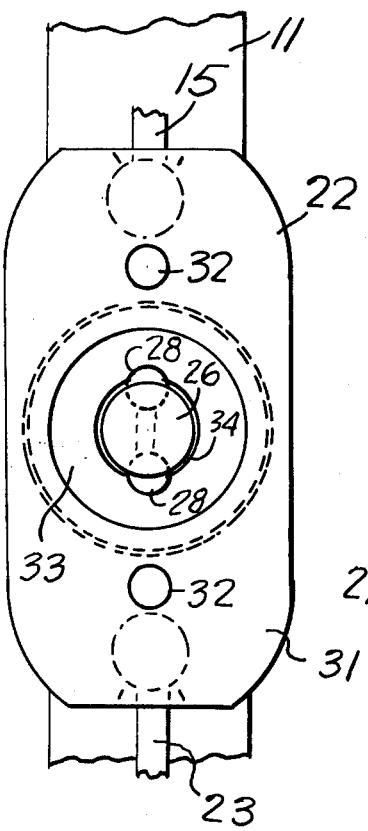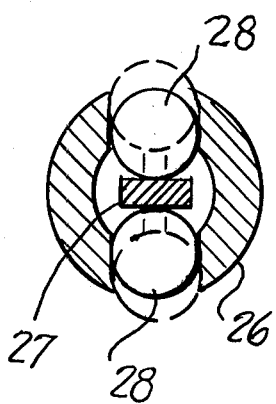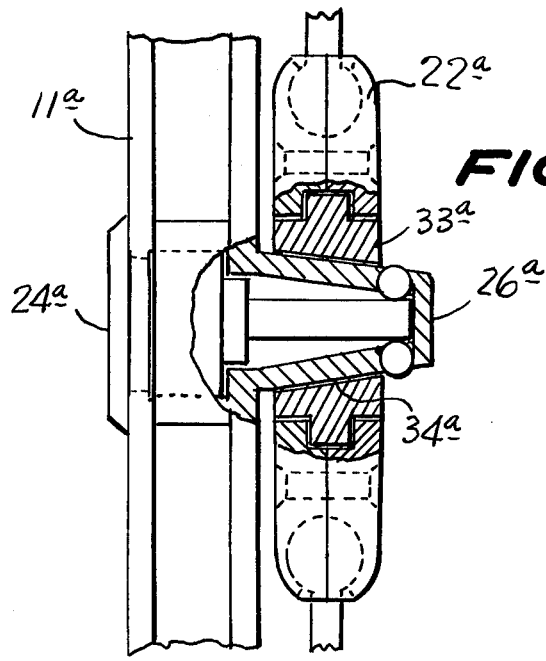

LOCKING LOAD BINDER

BACKGROUND OF THE INVENTION

Field of the Invention

The present invention relates to a key lock system for load binders to prevent the removal of the load binder after it has been tightened on the load.

SUMMARY OF THE INVENTION

The present invention includes an over dead center load binder having a rigid handle and chain engaging elements secured thereto. A keeper link forms a part of one of the chain engaging elements and a lock on the handle is adapted to engage therein to secure the handle to the link.

The primary object of the invention is to provide a lock for a load binder to prevent the removal of the binder after it has been tightened on a load.

Other objects and advantages will become apparent in the following specification when considered in light of the attached drawings.

BRIEF DESCRIPTION OF THE DRAWINGS

FIG. 1 is a side elevation of the invention;

FIG. 2 is a front elevation of the invention;

FIG. 3 is a side elevation of the invention with the lock disengaged from the keeper;

FIG. 4 is an enlarged fragmentary vertical sectional view taken along the line 4—4 of FIG. 2 looking in the direction of the arrows;

FIG. 5 is a fragmentary front elevational view;

FIG. 6 is an enlarged fragementary vertical sectional view taken along the line 6—6 of FIG. 4 looking in the direction of the arrows with the locking balls in unlocked position; and FIG. 7 is a view similar to FIG. 4 illustrating a slightly modified form of the invention.

DESCRIPTION OF THE PREFERRED EMBODIMENTS

Referring now to the drawings in detail wherein like reference characters indicate like parts throughout the several figures the reference numeral 10 indicates generally a locking load binder constructed in accordance with the invention.

The locking load binder 10 includes an elongate rigid handle 11 having a bifurcated end 12. A yoke 13 is secured in the bifurcated end 12 by means of a pivot pin 14 with the pivot pin 14 being spaced laterally from the center line of the handle. A bifurcated yoke 15 engages about the bifurcated end 12 of the handle 11 and is secured thereto by a pair of pivots 16, 17. The pivots 16, 17 are axially aligned and are spaced between the pivot 14 and the centerline of the handle 11.

A swivel link 18 is pivotally secured to the yoke 13 and has a link 19 secured thereto. A chain hook 20 is secured to the link 19 to be attached to a load chain 21 as can be seen in FIGS. 1 and 2.

A keeper link 22 is pivotally connected at one end to the bifurcated yoke 15 and at the opposite end to a chain hook 23. The chain hook 23 is adapted to engage the load chain 21 as can be best seen in FIGS. 1 and 2.

A cylinder lock 24 is secured to the handle 11 and is adapted to be actuated by a key 25. The handle 11 has a hollow conical boss 26 integrally formed thereon with a flat tongue 27 extending from the lock 24 centrally positioned therein. A pair of locking balls 28 are engaged in openings 29 in the conical boss 26 adjacent the outer end thereof with the openings 29 being shaped to permit the balls 28 to project partially outwardly of the conical balls 26 as can be seen in FIG. 4.

The keeper link 29 has a pair of plates 30, 31 secured together by rivets 32 with a keeper disk 33 secured therebetween. The keeper disk 33 has a conical opening 34 extending axially thereof to permit the boss 26 to engage therethrough. The balls 28 are adapted to engage the keeper disk 33 to prevent the handle 11 from being withdrawn from the keeper link 22 when the cylinder lock 24 has been turned to place the bar 27 in locked position engaging the balls 28. The keeper disk 33 has a thickness somewhat less than that of the keeper link 22 so that the boss 26 projects from the opposite side of the link 22 only slightly.

In the use and operation of the invention the chain 21 is applied to the load in a conventional manner and the hooks 20, 23 are engaged to opposite ends of the chain 21 with the handle 11 swung to a position closely adjacent the hook 20. From this position the handle is swung downwardly and toward the hook 23 thus tightening the chain 21 on the load with the handle 11 swinging over dead center to maintain the handle 11 in a binding position until it is moved bodily back to a position closely adjacent the hook 20. As the handle 11 is swung to its position closely adjacent the hook 23 the conical boss 26 is engaged in the conical bore 34 to the position illustrated in FIG. 4. The key 25 is then turned turning the lock and the lock bar 27 so that it forces the balls 28 outwardly in the openings 29 so as to engage behind the keeper disk 33 to prevent the conical boss 26 from being withdrawn from the conical bore 34 until the key is turned to permit the balls 28 to move inwardly of the conical boss 26.

A slightly modified form of the invention is illustrated in FIG. 7 wherein the handle 11a has a lock 24a with a conical boss 26a integrally formed with the handle 11a and extending outwardly therefrom. The conical boss 26a is somewhat longer than the conical boss 26 and extends completely through the keeper link 22a. A keeper disk 33a is mounted in the keeper link 22a and has a conical bore 34a extending therethrough to receive the conical boss 26a. The keeper disk 33a has the same thickness as the keeper link 22a and the conical boss 26a extends completely through the keeper disk 33a and the keeper link 22a as is seen in FIG. 7. The use and operation of the modified form of the invention as illustrated in FIG. 7 is identical to that of the preferred form of the invention illustrated in FIGS. 1 through 6.

Having thus described the preferred embodiments of the invention it should be understood that numerous structural modifications and adaptations may be resorted to without departing from the spirit of the invention.

What is claimed is:

1. A locking load binder comprising an elongate handle, a pair of yokes secured to one end of said handle in an over dead center arrangement, a lock secured to said handle and having a conical lock boss integrally formed with said handle and extending outwardly therefrom, a keeper link secured to one of said yokes, a keeper disk mounted in said keeper link and having a conical bore opening therethrough, and means for detachably securing said lock boss in said bore in said keeper disk.

2. A device as claimed in claim 1 wherein said keeper link is formed in two secured together parts with said keeper disk mounted therebetween.

3. A device as claimed in claim 1 wherein the means for detachably securing said lock boss to said keeper disk includes cam means mounted in said conical lock boss for engaging said keeper disk with said lock boss projecting through said keeper disk.

* * * * *